Fig. 2

INVENTOR.
Joseph H. Mosel.
BY
Corbett + Maloney
ATTORNEYS.

Sept. 12, 1933. J. H. MOSEL 1,926,397
PRECISION APPARATUS FOR CUTTING ROADS TO FINAL GRADE
Filed March 11, 1932 5 Sheets-Sheet 3

INVENTOR.
Joseph H. Mosel.
BY
ATTORNEYS.

Sept. 12, 1933. J. H. MOSEL 1,926,397
PRECISION APPARATUS FOR CUTTING ROADS TO FINAL GRADE
Filed March 11, 1932    5 Sheets-Sheet 4

INVENTOR.
Joseph H. Mosel.
BY
ATTORNEYS

Sept. 12, 1933.　　　　J. H. MOSEL　　　1,926,397
PRECISION APPARATUS FOR CUTTING ROADS TO FINAL GRADE
Filed March 11, 1932　　5 Sheets-Sheet 5

INVENTOR.
Joseph H. Mosel.
BY
Corbett & Mahoney
ATTORNEYS.

Patented Sept. 12, 1933

1,926,397

UNITED STATES PATENT OFFICE 1,926,397

PRECISION APPARATUS FOR CUTTING ROADS TO FINAL GRADE

Joseph H. Mosel, Columbus, Ohio, assignor to The Jaeger Machine Company, Columbus, Ohio, a corporation of Ohio Application March 11, 1932. Serial No. 598,225

8 Claims. (Cl. 37—108)

My invention relates to precision apparatus for cutting roads to final grade. It has to do, primarily, with a device for cutting dirt roads to final grade preliminary to the application of concrete slabs or other suitable material used in the building of roads, although it is not necessarily limited thereto.

One of the objects of my invention is to provide a precision apparatus that will effectively cut dirt surfaces to a final finished grade and which may be adjusted so as to govern the cutting depth and the crown of the road.

Another object of my apparatus is to provide an apparatus that will effectively cut a dirt surface to a predetermined grade and crown without unnecessary scattering of the loose dirt which is to be removed as the cutting operation is performed.

Another object of my invention is to provide a machine of the type indicated which will effectively cut a dirt surface to the proper grade and crown with a minimum amount of power.

Another object of my invention is to provide a machine of the type indicated wherein the adjustable parts thereof will be readily accessible and may be adjusted with a minimum amount of difficulty.

In its preferred form, my invention contemplates the provision of a structure which is designed to ride upon the forms normally used in road construction or upon other suitable tracks which may be provided therefor. In this preferred form, my invention further comprises a series of oscillating cutters that are preferably disposed across the entire front of the framework, although these cutters may be rotating or reciprocating cutters. These oscillating cutters are driven by means of suitable gears and crank arms and are adjustable independently of the driving mechanism. Furthermore, the cutting elements are adjustable in such a manner that any desired grade or crown may be produced on the road. The series of cutters oscillate transversely of the road and are adapted to undercut the material to be removed and to loosen such material in order to produce a surface having the proper grade and crown. The cutters are so disposed that they operate on the softer lower strata of material, thereby requiring less power to perform the cutting operation.

Directly in the rear of the cutting element, I have provided scraper blades that are adapted to guide and crowd the loosely cut dirt onto inclined scoops. These scoops are provided with conveying means which carry the loose dirt onto either shoulder of the road.

The preferred embodiment of my invention is shown in the accompanying drawings wherein similar characters of reference designate corresponding parts and wherein.

Figure 1:
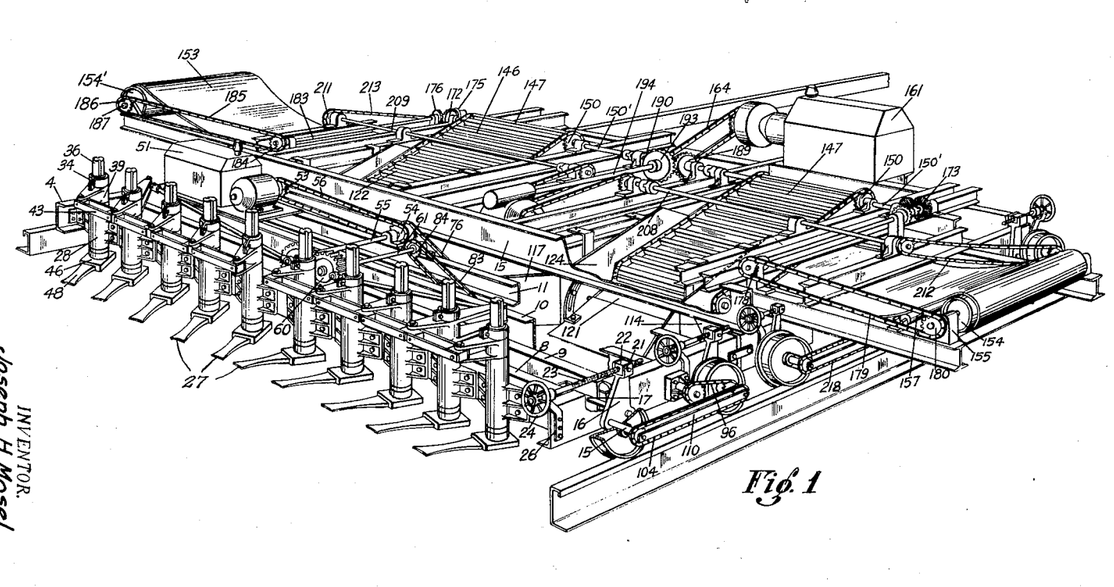
Figure 1 is a perspective view of an apparatus made in accordance with my invention.
Figure 2:
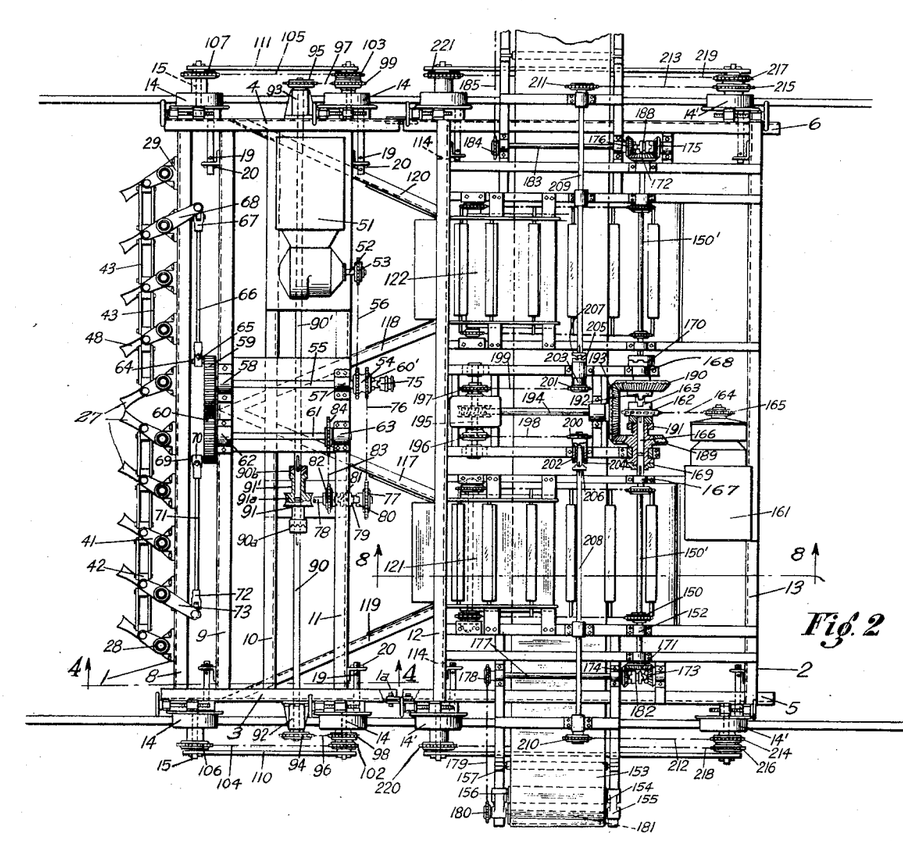
Figure 2 is a plan view of the apparatus shown in Figure 1.
Figures 3, 4, 5, 7:
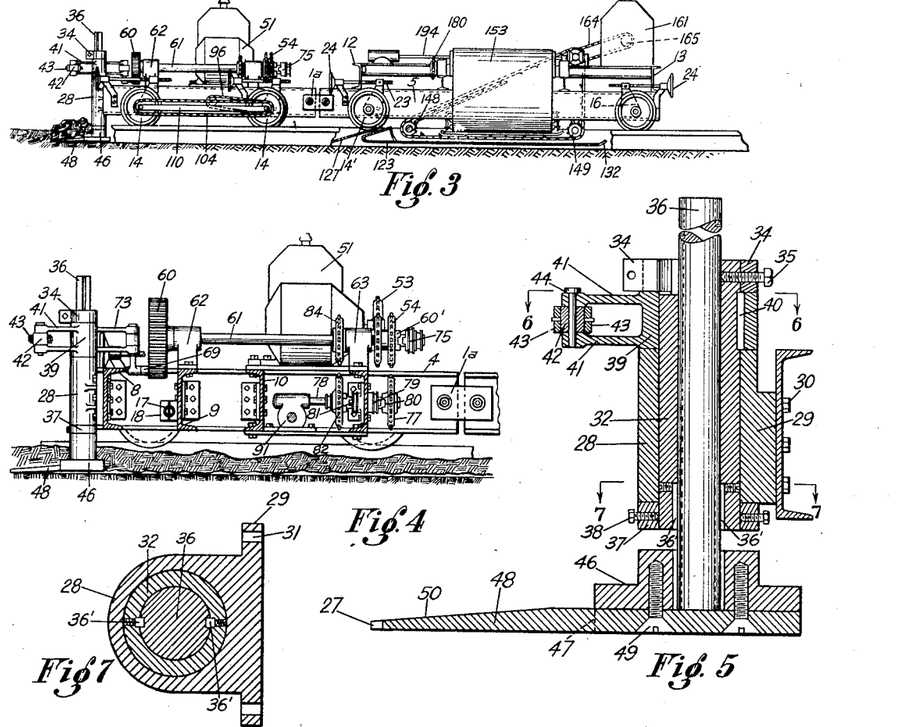
Figure 3 is a side elevation of the apparatus shown in Figure 1.
Figure 4 is an enlarged sectional view of the unit which carries the cutters, taken on line 4—4 of Figure 2.
Figure 5 is an enlarged sectional view of one of the cutters.
Figure 7 is a section of the cutter taken on line 7—7 of Figure 5.
Figure 6:
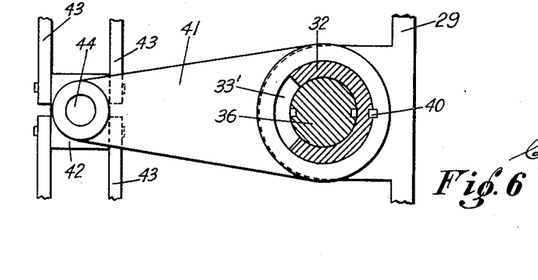
Figure 6 is a section of the cutter taken on line 6—6 of Figure 5.

In the drawings, referring particularly to Figures 1 and 2, my invention is shown as comprising a cutting unit 1 and a conveyer unit 2. These units may be used together or independently of each other. When they are used together, they are preferably pivotally secured to each other by straps 1a whose ends are connected to the longitudinal channel members of both units.

The cutting unit has a framework which comprises side channel irons 3 and 4 which are adapted to align with side channel irons 5 and 6 of the conveyer unit 2. This unit 1 is further provided with suitable cross channels 8, 9, 10 and 11 which are bolted to the side channel irons 3 and 4.

Figure 10:
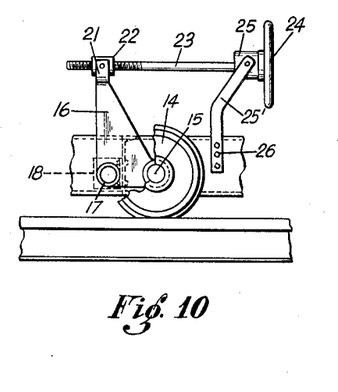
Figure 10 is a side elevation of one of the means for adjusting the frame vertically.
Figure 11:
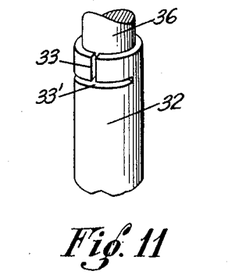
Figure 11 is a perspective view of the upper portion of the sleeve member.

The framework of the cutting unit is preferably supported at its four corners by means of traction wheels 14. These wheels 14 are mounted upon said framework by means of stub axles 15 that are securely mounted upon bell-cranks 16 (Figure 10), said bell-cranks being pivotally connected to the framework by means of pivot pins 17 (Figure 2). These pivot pins 17 preferably extend through the side channels 3, and 4, and are supported by means of bearing clips 18 which are rigidly mounted adjacent the ends of channels 9, and 11. The clips 18 are provided with apertures which receive the ends of the pivot pins 17. These pivot pins 17 are slidably mounted in the clip apertures, which permits the wheels to be laterally adjusted to conform with the gage of the truck.

The pivot pins 17 are further provided with holes 19, (see Figure 2) that receive pins 20, said pins precluding complete withdrawal of the shafts from the apertures in the clips. The upwardly extending arms of the bell-cranks 16 are bifurcated as at 21 (Fig. 10) and carry nuts 22 which are pivotally mounted in yoke members on the upper ends thereof so that the nuts may swing in a vertical plane. These nuts receive the threaded portion of the adjusting rods 23, the opposite ends of said rods being provided with hand wheels 24. These rods are further supported by means of bearings 25, which are pivotally mounted on the upper ends of the arms 25' so that they may swing in a vertical plane. These arms 25' are normally secured to the outer sides of channel members 3 and 4, as at 26.

Across the front of channel 8, (see Figs. 1 and 2) I have arranged two series of adjustable oscillating cutting elements 27. These cutting elements are driven in such a manner that, when the forwardly extending blades of one of the series swing in one direction, the blades of the other series swing in the opposite direction. It is obvious that this manner of cutting neutralizes any possibility of the cutting unit being shifted laterally as the unit moves forward.

As shown best in Figures 5, 6, 7, 11 and 12, each cutting element comprises a bearing 28 which has formed integrally thereon a bracket 29 that extends from each side thereof. This bracket 29 is secured to the face of the channel member 8 by means of bolts 30, which pass through slots 31 (Fig. 12) formed in bracket 29. It will be seen that each bearing member supports an entire cutting element, and that by adjusting these bearing members the cutting elements may be adjusted to any angle required for cutting the grade to a predetermined crown.

Mounted within each bearing 28, I have provided a sleeve 32 that is adapted to be rotated within said bearing. This sleeve 32 has near its upper end, (Figure 11), a vertical slot 33 which intersects a horizontal slot 33'. This construction renders the upper end of the sleeve flexible. This flexible portion is embraced by a clamping collar 34 (Figure 5) that is secured to sleeve 32 by means of set screw 35. This collar 34 is adapted to grip the flexible portion of the sleeve 32 tightly and to cause this portion of the sleeve to grip the main cutter spindle 36 which is also splined to the sleeve 32 as at 36' so that it may be adjusted vertically therein to raise or lower the cutter element.

The lowermost portion of sleeve 32 is provided with a collar 37 that is securely mounted thereon by means of a set screw 38. I further provide, between the upper portion of bearing 28 and collar 34, a casting 39 that embraces the sleeve 32 and which is keyed thereto by means of key 40. Casting 39 has integrally formed thereon a bifurcated arm 41 that carries a pivoted link support 42. This member 42 is connected to arm 41 by means of a pin 44.

A pair of links 43 is provided between each pair of link supports 42, so that the oscillation of any arm 41 will effect oscillation of all arms 41 which are thus connected. The clamping collar 34 and the collar 37 cooperate to hold the sleeve 32 in position within the bearing 28 and to hold the casting 39 upon the upper end of sleeve 32, preventing relative endwise movement of these parts.

It will be seen that each sleeve 32, being keyed to each casting 39, oscillates with this casting and that a cutter spindle oscillates therewith. Also, as pointed out above, since cutter spindle 36 is splined to the sleeve 32 at 36', the shaft may be adjusted to any height in such sleeve and held securely in the adjusted position by means of clamping collar 34.

The cutter spindle 36 carries at its lower extremity and keyed thereto, a shoe 46 whose under surface is cut away to form a channel 47. This channel 47 receives the shank of cutting element 48 secured rigidly to the shoe 46 by means of countersunk screws 49.

Figure 9:
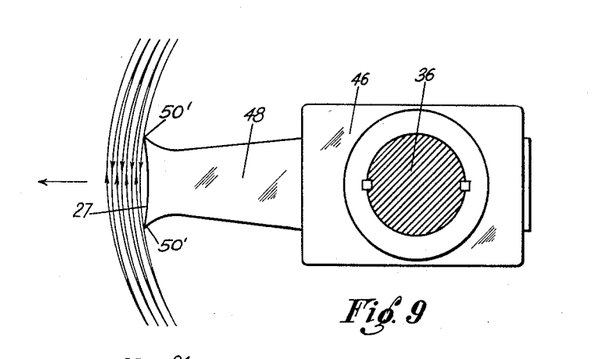
Figure 9 is a plan view of one of my cutters showing diagrammatically the cutting action of the blade as it moves forward.

The lower surface of the cutter 48 is a substantially horizontal plane surface. The upper surface of the cutter element 48 tapers downwardly and forwardly as at 50, and almost meets the straight horizontal surface of the cutter 48. It will be seen that the cutter is of substantially the form of a wedge which is adapted to cut underneath the material to be removed. Furthermore, each of these cutters is provided with sharp pointed corners 50' at its forward edge (Figure 9). It will be seen that when these cutters oscillate and the machine moves forwardly, the forward ends of the cutters will enter the soil below the hard top surface thereof and will wedge underneath the surface to be removed and raise it upwardly. The combination of the forward movement of the machine as a whole, and the oscillation of the cutters will cause the cutting edge of each cutting blade to follow a zigzag path in the lower strata of soil which is much softer than the top surface of the ground, thereby requiring less power and producing less wear on the cutting blades. Furthermore, as the cutters move forward, the loosened soil is separated as it passes behind the body portions of the cutting elements, thus forming furrows in the loosened dirt.

The driving mechanism which I utilize for operating the cutting elements and, also, for moving the cutting unit forwardly or rearwardly, is shown best in Figures 1, 2, 3 and 4. It comprises a power unit 51 of any suitable type. This power unit 51 is provided with a driving shaft 52 that has a sprocket 53 keyed thereto. The said sprocket 53 is adapted to rotate a double sprocket 54, which is loosely mounted on the shaft 55, through the medium of a chain 56. This double sprocket 54 is provided with a jaw 60' integrally formed thereon.

Shaft 55 is supported by means of bearings 57 and 58 which are mounted upon the framework of the cutting unit. The forward end of the shaft 55 has keyed thereto a gear 59 and this gear is enmeshed with a gear 60 which is keyed to the forward end of a shaft 61 which is supported upon the framework of the cutting unit in parallel relation to the shaft 55 by means of bearings 62 and 63.

The gear 59 carries a crank pin 64 upon which is rotatably mounted a pin block 65 to which is pivoted a pitman 66. The opposite end of this pitman 66 is connected by a pivoted link 67 to a crank arm 68 which is integrally formed with the casting 39 upon one of the cutter units. Thus, the rotation of the gear 59 will serve, through the medium of the pitman 66, to oscillate one of the cutters directly and, owing to the connected relation of these cutters effected by the links 43, four other cutters will oscillate therewith and in the same direction.

The gear 60 which is enmeshed with the gear 59 is likewise provided with a crank pin 69 upon which is rotatably mounted a block 70. This block 70 is pivotally connected to one end of a pitman 71, whose other end is connected by a pivoted link 72 to a crank arm 73, carried by the casting 39 on one of the cutter units. Thus, rotation of the gear 60 will bring about oscillation of the cutter unit to which it is connected and, owing to the connection of this cutter unit with four other cutter units by means of links 43, these other cutter units will be simultaneously oscillated in the same direction.

It should be noted, from the above description that, though all of the cutter units are simultaneously oscillated, they are oscillated in two groups. It should also be noted that, while one group is oscillating in one direction, the other group is oscillating in the opposite direction. One effect of this operation is that the forces set up by the oscillation of these two groups of blades in contact with the soil serve to counteract and neutralize each other to avoid excessive lateral stresses which might otherwise tend to divert the machine laterally from its course.

A means is provided for effecting the oscillation of the cutter units at either one of two speeds. Thus, the shaft 55 may be driven at one speed by the engagement of a jaw clutch member 75 with the complemental jaw clutch member 60' which is carried by the double sprocket 54. The clutch member 75 is splined to the shaft 55 and is slidable into engagement with the said double sprocket clutch 60' to effect the driving of this shaft at one rate of speed.

The double sprocket member 54 is connected by a sprocket chain 76 to a sprocket member 77 idly rotatable on a shaft 78. A clutch member 79 is splined to the shaft 78 and is movable into cooperative relation to the teeth of a clutch member 80 which is carried by the sprocket 77. A clutch member 81 is also splined to the shaft 78 and is slidable into cooperative relation with clutch teeth on a sprocket 82 so as to cause such sprocket to rotate with the shaft 78. The sprocket 82 is connected by means of a sprocket chain 83 to a sprocket 84 on the shaft 61. When this connection is effected with the jaw clutch 75 disengaged, owing to the fact that the sprocket and chain gearing is of a lower gear ratio, the cutter units will be oscillated at a lower rate of speed.

From this, it will be apparent that the cutter units may be oscillated either at a comparatively high rate of speed or at a comparatively low rate of speed, depending upon the adjustment of the clutch members, as just described. Where the ground is hard the low rate of speed is more desirable. The rates of speed selected may be varied at will by the provision of suitable gear ratios.

The mechanism just described also forms a part of the mechanism for moving the cutter unit forwardly or rearwardly under the control of a clutch (not shown) which is located within the power unit 51. In this operation, the shaft 78 is connected to cross shafts 90 and 90' by a worm drive structure, generally designated 91. The inner ends of shafts 90 and 90' extend idly within a sleeve member 91', integrally formed on the worm gear 91a. The shafts 90 and 90' are further provided with clutch members 90a and 90b that are splined to the shafts, which permits the said shafts to be disengaged from the worm gear 91a.

The shafts 90 and 90' extend the full width of the cutter unit and project beyond the channels 3 and 4, being supported thereon by bearings 92 and 93. At their extremities, they are provided with sprockets 94 and 95 which are connected by sprocket chains 96 and 97 to sprockets 98 and 99, which are rigidly connected to traction wheels 14.

It will be seen from this description that the clutch members which are located at the gear housing 91 make it possible to drive the cutter unit either by the traction members on both sides or by the traction members on one side alone. The latter form of driving operation in sometimes desirable to correct a tendency of the machine to go askew.

Secured to the outer sides of the sprockets 98 and 99 are sprockets 102 and 103 which are connected by chains 104 and 105 to sprockets 106 and 107 which are secured to front of traction wheels 14. This structure provides a means for positively driving all four traction members of the cutting unit from the shafts 90 and 90'. Bracing bars 110 and 111 extend between the stub axles which carry the traction members to prevent wobbling of the outer ends thereof.

Figure 8:
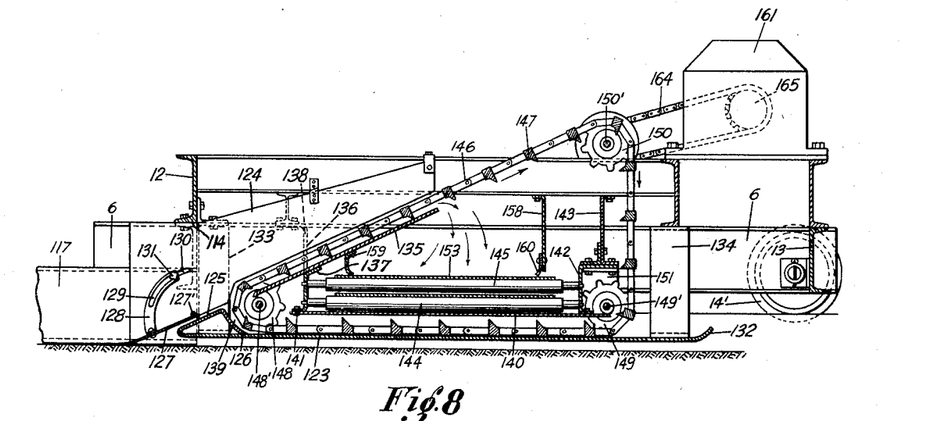
Figure 8 is an enlarged sectional view of the conveying unit taken on line 8—8 of Figure 2.

The conveying unit is secured to the rear of the cutting unit, as previously described. This unit is carried by means of flanged traction wheels 14' which are located at the four corners of the structure. These wheels are supported in the same manner as the wheels 14. The unit is best shown in Figures 2 and 8.

The framework comprises side channels 5 and 6 which are secured together by the cross channels 12 and 13. The channels 5 and 6 are provided with short channel members 114 which are secured to the inner side and forward ends thereof. The rear end of the framework is provided with the channel 13, which extends the entire width of the structure and is secured to the inner sides of the side channels 5 and 6, by suitable angle clips. The short channels 114 are adapted to carry a long channel member 12 that preferably bridges the entire front of the framework.

The forward end of the framework is provided with centrally disposed forwardly converging channel members 117 and 118 which are secured at their rear ends to the under side of channel 12 and which are removably but rigidly connected at their forward ends to the channel member 9 of the cutting unit. The forward end of the V thereby produced lies directly in the center of the cutting unit and in the rear of the oscillatory cutting members. Channel members 119 and 120, which diverge and extend forwardly, are also secured at their rear ends to the under side of channel member 12. They are likewise rigidly but removably secured to the under and forward portion of channels 3 and 4 of the cutting unit. Also, the side members 5 and 6 of the conveying unit may be removably bolted to the side members 3 and 4 of the cutting unit.

It will be seen that the arrangement of channel members 117, 118, 119 and 120 form two distinct channel ways, that serve to direct the loose soil rearwardly. It is obvious that when the framework moves forward, these channels tend to embrace the loose soil and crowd it rearwardly to a conveying means that will be described subsequently.

I have further provided two inclined scoops 121 and 122 (Figures 2 and 8) that lie directly in the rear of the narrowed portion or throat of the crowding means formed by the channel members 117, 118, 119 and 120. These scoops 121 and 122 are supported by means of an inner substructure which is constructed of suitable channel members and which is further adapted to support the driving mechanism for the different conveyer units.

The scoop 121 comprises a lower plate 123 and side plates 124 (Figure 8). The forward end of the plate 123 is bent upwardly and rearwardly for a short distance as at 125, thence downwardly to the upper face of the plate as at 126. A plate 127 overlaps the upper surface of the inclined portion 125 and is pivotally connected to each of the side plates 124 as at 127'. The plate 127 further extends forwardly and downwardly to the surface of the finished grade. It is provided with arcuate strap members 128 that are rigidly secured to the upper face thereof and adjacent each side edge thereof. The straps 128 are preferably provided with slots 129 that are adapted to align with slots 130 formed in the side plates 124. The slots 129 and 130 are adapted to receive special bolts 131. These bolts are of such a type that they may be adjusted along the slots 130 and held in any adjusted position.

The straps 128 are free to move up and down on the bolts 131 in the slots 129. This will permit the forward end of the scoop plate 127 to rise and fall when necessary so that it may ride over any unyielding obstruction. It will be obvious that this floating action enables the plate 127 to rise when coming in contact with a boulder or other unbroken material that may be projecting above the surface of the finished grade. It will further be seen that the extent of the up and down movement of the plate 127 may be governed by adjusting the bolts 131 along the slots 130.

The scoop 121 is adapted to receive all of the loosened soil that is guided rearwardly thereto. The rear of the plate 123 is turned upwardly as at 132, which eliminates any possibility of the plate cutting into the finished surface if the unit is moved rearwardly. The plate 123 is suspended from the framework by a strap 133 which is secured adjacent the front thereof and strap 134 which is secured adjacent the rear thereof. These straps are secured to the inner substructure of the conveying unit frame by suitable means.

The scoop 121 is further provided with an upwardly and rearwardly inclined plate 135, that is supported by means of a member 136 whose center portion is bent rearwardly as at 137 for connection to the underside of said inclined plate. The member 136 also has upwardly extending arms as at 138 which are secured to the substructure of the conveying unit 2. A space 139 is formed between the lower edge of plate 135 and the downwardly extending portion 126 of the forward end of the scoop. The purpose of this space 139 is to permit scraping units to pass therethrough, as will be seen as the description progresses.

I have further provided a horizontal plate 140 which is disposed slightly above the lower plate 123. The front end of this plate 140 is bolted to the lower end of member 136 as at 141. The rear end of the plate 140 is supported by means of a bent plate 142 that is, in turn, supported by means of a channel 143 which is secured to the substructure of the framework. This plate 140 extends from the outer side of one of the scoops to the outer side of the other scoop. Members 136 and 142 are further adapted to carry series of spaced idling rollers 144 and 145. The rollers 145 are located at a higher level than are the rollers 144. Members 136 and 142 are provided with holes that receive the stub axles of the rollers, thus forming a bearing for the said rollers.

An elevating conveyer 146 of endless form, is provided for conducting the dirt upwardly along the upper surface of plate 135. This conveyer preferably comprises two strands of chain which are disposed along opposite edges of the plate 135 and which travel over the said plate and under plate 140. These strands of the conveyer chain carry a plurality of spaced scraping bars 147 which are operative to travel upwardly along the upper surface of plate 135 and lift the dirt thereon.

The conveyer is driven by the coaction of the chain strands with three pairs of sprockets 148, 149 and 150. Sprockets 148 are carried by shaft 148'. Sprockets 149 are carried by shaft 149' and sprockets 150 are carried by shaft 150'. Sprocket shaft 148' is supported by bearing members (not shown) but which are mounted upon the sides of strap member 133. Shaft 149' is carried by bearing members 151 which are mounted on the under side of member 143. Shaft 150' is carried by bearings 152 (Figure 2).

It will also be seen that the plate 123 supports the lower portion of the conveyer and prevents it from sagging into contact with the surface of the grade so as to prevent the marring of this surface.

It will be noted that the plate 135 is of comparatively short length and, by reference to Figure 8, it will be seen that the dirt carried upwardly along this plate by the elevating conveyer 146 falls downwardly upon a transverse conveyer 153 whose upper web is supported by the rollers 145 and whose lower web is supported by the rollers 144. This conveyer conducts the dirt laterally and is preferably effective to deliver this dirt onto a shoulder of the road.

A bracket member 158 and plate 135 (Figure 8) are provided with flexible guards 159 and 160 that prevent the soil from falling off the rear and front sides of the belt as it is transferred and discharged on the shoulder of the road. This insures a clean graded surface.

The structure of the conveyer scoop 122 is identical with the structure of the conveyer scoop 121, which has just been described. The conveyer 153 (Figure 2) extends to each side of the conveying unit, as indicated, and I have provided structures that are adapted to support drums 154 154' whose shafts rest within bearings 155. These drums are adapted to carry the endless widefaced belt 153, which is preferably further supported on idlers 156, and on idlers 157, which are illustrated in Figure 2.

The mechanism for driving the said conveying means and, also for driving the traction wheels of the conveying unit comprises a motor 161 (Figture 2) that drives the sprocket 162 which has clutch teeth 163 integrally formed on both sides thereof. This sprocket 162 is driven by a chain 164 and sprocket 165 which is mounted on the drive shaft of the motor. The sprocket 162 is keyed to the shaft 166 which is carried in bearings 167 and 168, and which is adapted to be connected to or disconnected from the shafts 150' by means of clutches 169 and 170. These clutches 169 and 170 may be disengaged to render the elevator conveyers immovable during the transportation of the conveyer unit.

The shafts 150' are extended beyond the outer sides of the conveyer unit and at their extremities carry beveled gears 171 and 172 which are enmeshed wtih spaced beveled pinions 173 and 174, and 175 and 176.

The beveled pinions 173 and 174 are carried upon a shaft 177 whose opposite end carries a sprocket 178 which is designed to drive the transverse conveyer 153 through the medium of a sprocket chain 179 and a sprocket 180 which is keyed to the shaft 181, which carries the drum 154 on one side of the machine. The shaft 177 is caused to rotate in either direction by adjustment of the jaw clutch member 182 which is intermediate the beveled pinions 173 and 174 and which may be moved into cooperative relation with clutch teeth on either of such pinions.

The beveled pinions 175 and 176 are carried by a shaft 183 whose outer extremity carries a sprocket 184 for positively driving the other end of the transverse belt through the medium of the sprocket chain 185 and the sprocket 186 on the shaft 187 which carries the other drum 154'. The shaft 183 also carries, in between the beveled pinions 175 and 176, a double jaw clutch member 188 which is adjustable into cooperative relation with jaw teeth on the inner surfaces of the beveled pinions 175 and 176 so that the shaft 183 may be caused to rotate in either direction.

It will be apparent from this structure that the transverse belt is positively driven at both ends. This makes possible the maintenance of the belt with its upper web in sagging position, as shown in Figure 1, so that it will be able to carry a heavier layer of soil without interfering with the framework above the belt. It will be readily understood that the distribution of the loose soil may be alternated by driving the belt 153 in alternate directions, thus placing the dirt on the shoulder of the road where it is most needed.

The driving means for effecting transportation of the conveyer unit comprises beveled gears 189 and 190 which are carried upon shaft 166 and which may be alternately clutched to the sprocket 162, which is keyed to the shaft 166, by clutch members 191 and 192. These beveled gears are enmeshed with a beveled gear 193 carried by a shaft 194 whose opposite end has a worm gear connection with a short transverse shaft 195. This short transverse shaft carries sprockets 196 and 197 which are keyed thereto and which drive sprocket chains 198 and 199, which in turn drive sprockets 200 and 201 on sleeves 202 and 203.

The sleeves 202, 203 are provided on their opposite ends with clutch members 204 and 205 which are disposed in cooperative relation to clutch members 206 and 207 splined upon shafts 208 and 209. These shafts 208 and 209 carry sprockets 210 and 211 at their outer extremities so that they may drive sprocket chains 212 and 213 which in turn drive sprockets 214 and 215, which are rigidly secured to the rear traction wheels 14'. Sprockets 216 and 217 are connected to the sprockets 214 and 215 and drive sprocket chains 218 and 219 which in turn drive sprockets 220 and 221 connected to the forward traction wheels 14' of the conveyer unit.

It will be seen from this description that the conveyer unit may be driven either forwardly or rearwardly, depending upon whether the beveled gear 189 or the beveled gear 190 is connected to the sprocket 162. It will also be noted that the use of the clutch members 204 and 205 makes possible the driving of the conveyer unit either by the traction members on both sides or by the traction members on one side alone, the latter form of driving operation being sometimes desirable to correct a tendency of the machine to go askew.

In the operation of my apparatus, as described, I preferably provide forms or track members which are laid along both sides of the road before the actual cutting operation is in progress. My apparatus is then mounted upon the tracks or forms and placed over a trench whose lower surface is cut to the proper grade. The cutting units are then lowered into the trench and the cutters are adjusted for the predetermined grade and crown. The apparatus then travels forward, permitting the cutting units to oscillate, while the cutting unit as a whole travels in a straight path. This causes the cutting blades to cut in a zigzag path with an undercutting action which loosens and raises the material from beneath.

Another method which I may use for commencing the cutting operation is to provide tracks or forms on which the apparatus is mounted. These tracks or forms are inclined downwardly and forwardly to such an extent that the apparatus will cut downwardly and forwardly. When the proper grade level is reached, the apparatus will be caused to travel on level tracks or forms and to maintain the cutting operation at the proper grade, while the cutters are adjusted, if necessary, to produce the proper crown on the surface.

The operation is preferably such that the apparatus as a whole moves forward at a slow rate, while the cutters oscillate at a comparatively high rate of speed, giving the cutting action which is illustrated diagrammatically in Figure 9. The space between the cutters is preferably such that the cutting arcs of adjacent cutters substantially meet at each end of their cutting stroke.

The advancing cutters also ride between the loose material and spread it to each side thereof. This action produces furrows in the loose material and this loose material is then crowded onto the elevating conveyers and delivered by these elevating conveyers to the transverse conveying belt, being discharged to either side of the road, as may be desirable.

Figures 12, 13:
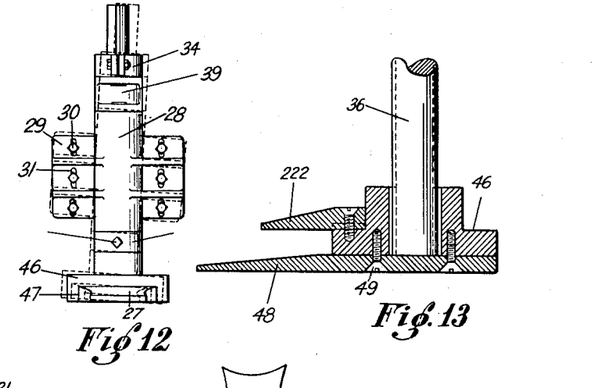
Figure 12 is a front view of one of the cutters showing a possible adjustment in dotted lines.
Figure 13 is a modified form of a cutter in section, showing a breaker tooth in combination with the regular tooth.

A modified form of oscillating cutter, which I may use, is shown in Figure 13. This cutter is substantially identical with the cutters previously described, except that it is provided with an extra breaker tooth 222. This extra breaker tooth may be used when the surface of the ground being cut is particularly hard. It assists in the cutting action by directly attacking the uppermost layer of the soil and by preventing this uppermost layer from coming into contact with the housings on which the cutters are mounted. This tooth also tends to prevent wedging of the material in between the cutters.

Figures 14, 15, 16, 17:
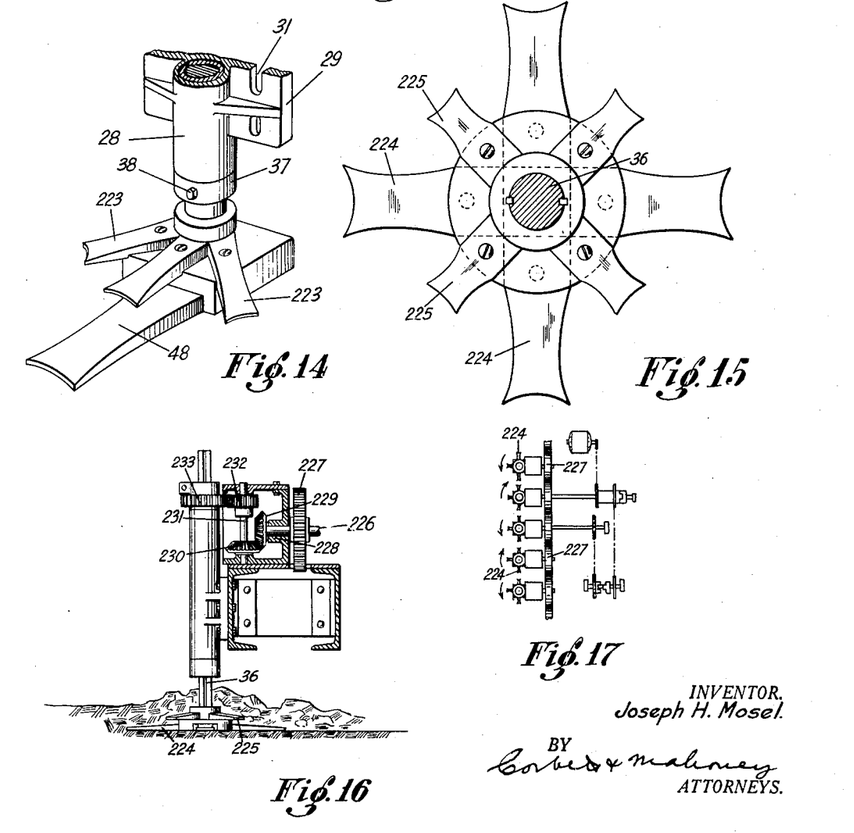
Figure 14 is a perspective view of a cutter similar to that shown in Figure 13, and showing a series of breaker teeth.
Figure 15 is a plan view of another modified form of cutter, which is adapted to be used as a rotary type.
Figure 16 is a side elevation in section showing the driving means for the rotary type of cutter shown in Figure 15.
Figure 17 is a diagrammatic plan view showing the method of rotating the cutters shown in Figures 15 and 16.

In Figure 14, I have shown a still further modification of my oscillating cutter unit. This modified cutter unit is substantially identical with the cutter unit previously described, except that it comprises a series of radially extending upper cutting units 223 which are bolted to the foot of the cutter member.

A still further modified form of cutter unit, which I may use, is illustrated in Figures 15, 16 and 17 of the drawings. In this form, the cutter unit is designed to be rotated, instead of being oscillated. It comprises a series of lower cutting blades 224 which are bolted to the foot of the cutter unit and which extend radially therefrom, being preferably four in number. This cutter unit also comprises four upper blades 225 which are bolted to the upper side of the foot of the cutter unit and which project radially therefrom into the angles formed by the cutter units 224.

As shown in Figure 16, the mechanism for driving each cutter unit preferably comprises a shaft 226 upon which is keyed a gear 227 and which is supported in a bearing 228. The forward end of the shaft 226 carries a beveled gear 229 which meshes with a beveled gear 230 upon a vertical stub shaft 231. This shaft 231 carries a gear 232, keyed thereto, and enmeshed with a gear 233 upon the sleeve of the cutter unit.

It will be understood that a plurality of these rotary cutting units will preferably be provided and that suitable means may be provided for driving all of such cutting units simultaneously. However, it is desirable that adjacent cutter units simultaneously rotate in opposite directions. The mechanism for effecting this is illustrated diagrammatically in Figure 17, wherein it appears that a series of intermeshing gears 227 is provided so that this rotation of the adjacent cutting units in opposite directions may be effected. Any suitable means for transmitting power to these intermeshing gears may be utilized.

It will be seen that I have provided an apparatus for cutting surfaces to grade and crown which has many superior characteristics. For example, the soil is cut with an undercutting action. This is always desirable, since it enables the power utilized to be greatly reduced. It is particularly desirable in the harder types of soil or in frosty ground. Furthermore, the cutters are of such a type that their action results in practically no throwing of the material. Another feature of advantage arises from the fact that the method of cutting greatly reduces the wear on the cutting blades and, at the same time, results in a much greater breaking up of the material being cut.

My apparatus is not necessarily limited to subgrading dirt roads, but may be utilized in grading any uneven dirt surfaces, and for tillage of the soil preparatory for agricultural purposes. The cutters may be so arranged as to form widely-spaced furrows. It will be obvious that, when used for agricultural purposes, the conveying unit and scraping blades will be eliminated. It will also be understood that, when used for agricultural purposes, widefaced traction wheels or endless traction members may be substituted for the flange wheels that ride upon the forms.

Having thus described my invention what I claim is:

1. Apparatus for cutting dirt surfaces to grade comprising a framework, a plurality of cutter elements, said cutter elements being disposed across a framework, said cutter elements being provided with radial wedge-shaped cutter blades and radial breaker teeth, means for driving said cutter elements, and means for adjusting said cutter elements.

2. Apparatus for cutting dirt surfaces to grade comprising a plurality of cutting elements which are vertically and angularly adjustable, said cutting elements being adapted to undercut the surface to be removed, scraping blades and scraping scoops for collecting the loosened dirt, and conveyer mechanism for distributing the loosened dirt.

3. Apparatus for cutting dirt surfaces to grade comprising a framework, cutter elements, each of said cutter elements comprising a housing which is secured to said framework in such a manner that it is angularly adjustable, a sleeve rotatably mounted in said housing, a shaft mounted in said sleeve and adapted to rotate therewith, said shaft being axially adjustable of said sleeve, a cutting blade removably mounted on the lower end of said shaft, and means for oscillating said sleeve members.

4. Apparatus for cutting dirt surfaces to grade comprising a framework, cutter elements, each of said cutter elements comprising a housing which is secured to said framework in such a manner that it is angularly adjustable, a shaft mounted in said housing and being vertically adjustable therein, a cutting blade mounted on the lower end of said shaft, said cutting blade being adapted to undercut the surface to be removed.

5. Apparatus for cutting dirt surfaces to grade comprising a framework, cutter elements, each of said cutter elements comprising a housing secured to said framework, a sleeve rotatably mounted in said housing, a shaft mounted in said sleeve and adapted to rotate therewith, said shaft being vertically adjustable in said sleeve, cutting blades on the end of said shaft, said blades being adapted to undercut the material to be removed.

6. Apparatus for cutting dirt surfaces to grade comprising a framework, cutter elements, each of said cutter elements comprising a housing secured to said framework in such a manner that it is angularly adjustable, a shaft rotatably mounted in said housing, a cutting blade on the lower end of said shaft, said cutting blade being adapted to undercut the material to be removed.

7. Apparatus for cutting dirt surfaces to grade comprising a framework, cutter elements, means for driving said cutter elements, means for adjusting said cutter elements vertically and angularly, said cutter elements comprising cutting blades and breaker teeth.

8. Apparatus for cutting dirt surfaces to grade comprising a framework, cutter elements, means for driving said cutter elements, said cutter elements being angularly adjustable, and said cutter elements comprising cutting blades and breaker teeth.

JOSEPH H. MOSEL.